(12) United States Patent
Gorgerino et al.

(10) Patent No.: US 7,061,736 B2
(45) Date of Patent: Jun. 13, 2006

(54) METHOD TO PROJECT ELECTRONICS FROM LOAD DUMP

(75) Inventors: Andrea Gorgerino, Redondo Beach, CA (US); Klaus S Jensen, Silkeborg (DK)

(73) Assignee: International Rectifier Corporation, El Segundo, CA (US)

( * ) Notice: Subject to any disclaimer, the term of this patent is extended or adjusted under 35 U.S.C. 154(b) by 425 days.

(21) Appl. No.: 10/403,246

(22) Filed: Mar. 28, 2003

(65) Prior Publication Data

US 2003/0231442 A1    Dec. 18, 2003

Related U.S. Application Data

(60) Provisional application No. 60/369,384, filed on Apr. 1, 2002.

(51) Int. Cl.
*H02H 7/09* (2006.01)

(52) U.S. Cl. ........................ 361/91.1; 361/33

(58) Field of Classification Search ............... 361/18, 361/20, 21, 23, 24, 25, 91.1, 111, 33
See application file for complete search history.

(56) References Cited

U.S. PATENT DOCUMENTS

| | | | | |
|---|---|---|---|---|
| 5,119,265 A | * | 6/1992 | Qualich et al. | 361/103 |
| 5,130,883 A | * | 7/1992 | Edwards | 361/91.1 |
| 5,477,675 A | * | 12/1995 | Ingraham et al. | 60/418 |
| 5,569,995 A | * | 10/1996 | Kusaka et al. | 318/717 |
| 6,650,521 B1 | * | 11/2003 | Dubhashi et al. | 361/91.1 |

* cited by examiner

*Primary Examiner*—Brian Sircus
*Assistant Examiner*—Danny Nguyen
(74) *Attorney, Agent, or Firm*—Ostrolenk, Faber, Gerb & Soffen, LLP

(57) ABSTRACT

A method for averting damage that may be caused by a transient energy surge during a load dump event, the method including detecting the load dump event and in response causing the consumption of transient excess energy due to the load dump event.

19 Claims, 6 Drawing Sheets

METHOD TO PROJECT ELECTRONICS FROM LOAD DUMP

RELATED APPLICATION

The application is based on and claims benefit of U.S. Provisional Application No. 60/369,384, filed Apr. 1, 2002, entitled METHOD TO PROTECT ELECTRONICS FROM LOAD DUMP USING MOTOR, to which a claim of priority is made.

BACKGROUND OF THE INVENTION

Most automotive power electronics systems must comply with standards for transient immunity. One such standard is ISO 7637-1. ISO 7637-1 is an over voltage protection standard.

FIG. 1 shows a simulation of a transient condition which occurs when the car battery is disconnected while the car alternator is generating charging current and the loads remain connected to the alternator. The transient condition shown by FIG. 1 is conventionally referred to as a load dump event. Load dump may occur due to a fortuitous event such as battery cable corrosion, poor cable connection or the disconnection of the battery while the engine is running.

The amplitude of a load dump transient pulse depends on the alternator speed and on the level of the alternator field excitation at the moment of the battery disconnection, while the duration of the pulse depends essentially on the time constant of the field excitation circuit and on the amplitude of the pulse.

The following are the relevant parameters for understanding the load dump event illustrated by FIG. 1.

$V_s$=+26.5 V to +86.5V
$R_i$=0.5 Ω to 4 Ω
$t_d$=40 ms to 400 ms
$t_r$=5 ms to 10 ms

It should be noted that the internal resistance Ri of an alternator, in case of load dump, is mainly a function of the rotational speed of the alternator and the excitation current as seen in the following relationship:

$$R_i = \frac{10 \times V_{nom} \times N_{act}}{0.8 \times I_{rated} \times 12000 \text{ min}^{-1}}$$

where $V_{nom}$ is the specified voltage of the alternator;
$I_{rated}$ is the specific current at an alternator speed of 6000 min$^{-1}$ (as given in ISO 8854); and
$N_{act}$ is the actual alternator speed, in reciprocal minutes.

Also, it should be noted that the pulse is determined by the peak voltage $V_s$, the internal resistance $R_i$, and the pulse duration $t_d$. In all cases, small values of $V_s$ are correlated with small values of $R_i$ and $t_d$, and high values of $V_s$ with high values of $R_i$ and $t_d$. The latter parameters define the dynamic behavior of an alternator during load dump.

Ideally, electronic devices in an automobile that can be damaged by the high voltage generated during a load dump event are protected. FIG. 2 shows a conventional voltage suppression technique for preventing damage to an electronic control unit (ECU) 10 during a load dump event. The ECU may be a control circuit for controlling the operation of an electric motor. As shown by FIG. 2, Zener diode 12 is used for voltage suppression of a transient voltage generated during a load dump event. The load dump event is schematically illustrated by load dump generator 14. Zener diode 12 imposes a constant voltage on the terminals of ECU 10, and sinks the required amount of current to drop the exceeding voltage on the source impedance. In the circuit shown by FIG. 2, the breakdown voltage of Zener diode 12 is chosen in view of the voltage that the circuit can withstand. The higher the breakdown voltage of ECU 10, the less energy Zener diode 12 has to dissipate. Hence, Zener diode 10 may be smaller.

The use of Zener diodes in voltage suppression presents the designer with certain challenges. For example, the breakdown voltage of Zener diodes change over temperature, which requires the designer to be mindful of temperature changes and may even restrict the use of ECU 10 to environments in which temperature changes are modest or controlled. Also, Zener diodes add space and cost to any system and require large tracks on the circuit board to carry high current. Thus, it is desirable to eliminate the Zener diode.

Another solution to the load dump problem is to increase the rated voltage of all the to-be-protected electronic components. Unfortunately, increasing the breakdown voltage of electronic components decreases their performance, thus requiring larger and more expensive components to be used.

SUMMARY OF THE INVENTION

The objective of the present invention is to obtain overvoltage protection without using a Zener diode. To achieve the objective of the present invention the electronic devices already present in the system are used to consume the energy that would normally be absorbed by the Zener diode.

According to the present invention, to prevent damage to an electronic circuit due to a load dump the load dump event is detected and, in response to the detected load dump event the excess transient current is consumed by a device within the system.

To detect the load dump event one of two methods may be used. First, samples from the voltage output of the battery may be taken and when two consecutive voltage samples from the battery are different from one another by a predetermined value, e.g. 0.5 V, it is determined that a load dump event is taking place. Second, a load dump event is detected when the voltage output from the battery reaches a predetermined maximum value.

According to the first embodiment of the present invention, in order to prevent damage to an ECU which may result from load dump the motor which is connected and controlled by the ECU is driven into saturation. Specifically, according to the first embodiment of the present invention, the current for generating the magnetic field in the motor is increased to drive the motor into saturation to cause the motor to operate inefficiently in order to consume the excess transient energy.

According to the second embodiment of the present invention, in order to prevent damage to an ECU which may result from load dump, the energy generated due to load dump is directed to and consumed by an electro-mechanical device. For example, the speed of the motor connected to the ECU is allowed to increase in order to consume the excess transient energy.

It should be noted that protection against a load dump event is required when the current absorbed by the to-be-protected ECU is fairly low (usually light load and low speed). However, when the mechanical load is increased the required current will create a voltage drop on the source impedance sufficient to limit the voltage to a safe value.

DETAILED DESCRIPTION OF THE INVENTION

According to the first embodiment of the present invention, damage to an ECU due to a load dump event may be prevented by increasing the iron losses in the motor that is controlled by the ECU in a controlled manner to cause the consumption of the excess transient energy until a safe voltage value is reached.

Figure 1:
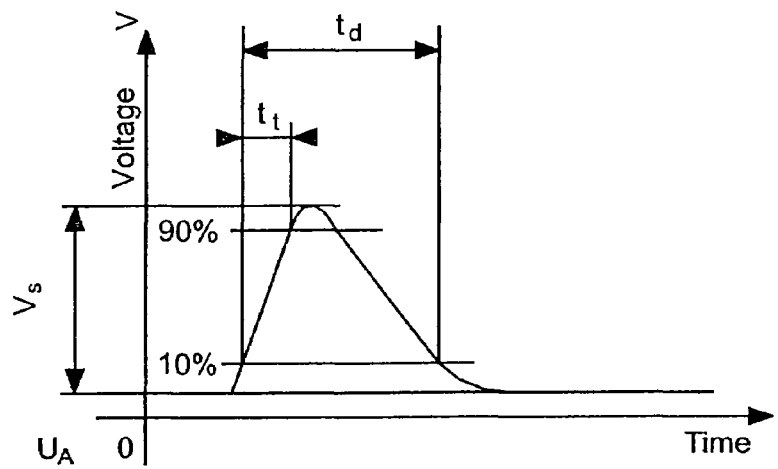
FIG. 1 shows a graphical representation of a load dump event.
Figure 2:
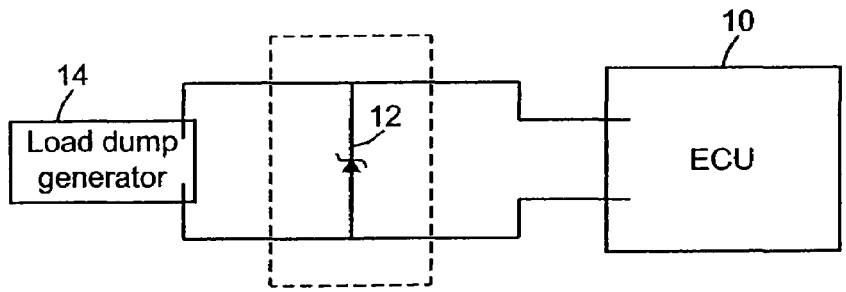
FIG. 2 shows a functional diagram for an electronic control system having an over-voltage suppression feature according to prior art.
Figure 3:
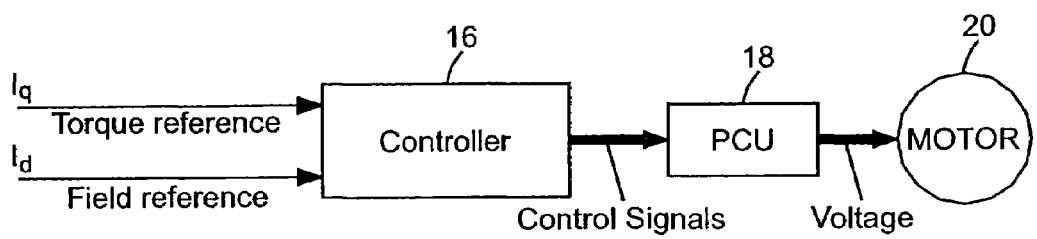
FIG. 3 shows a functional block diagram for an automotive motor control technique.

FIG. 3 shows a functional block diagram for a known motor control technique in which the motor is magnetic field generating current and torque generating current are separately controlled. The motor control technique shown by FIG. 3 includes controller 16 which is operatively connected to power circuit unit (PCU) 18. PCU 18 may be comprised of power switching devices such as MOSFETs or IGBTs in a half-bridge, full bridge configuration or some other configuration. Controller 16 sends control signals to the power switching devices of PCU 18 in order to control the operation of motor 20, such as its speed, by controlling the voltage supplied thereto. Controller 16 shown by FIG. 3 controls the field generating current and the torque generating current independent from one another according to a predetermined maximum limit. To ensure that motor 20 is operating within the maximum limit, reference currents are supplied to controller 16, which set the maximum limit for each type of current. For example, torque reference current $I^*_q$ sets the maximum limit for the torque current and the field reference current I*d sets the maximum limit for the field generating current.

In some motor control circuits, controller 16 may not control both torque generating current and field generating current independently. For example, there may be a controller which can only control the speed of the motor. In such motor control circuits, the maximum speed of the motor may be predetermined. A method for obtaining such a result includes limiting the amount of current which may be supplied by the motor control circuit to a maximum limit which may be set by a reference current.

Figure 4:
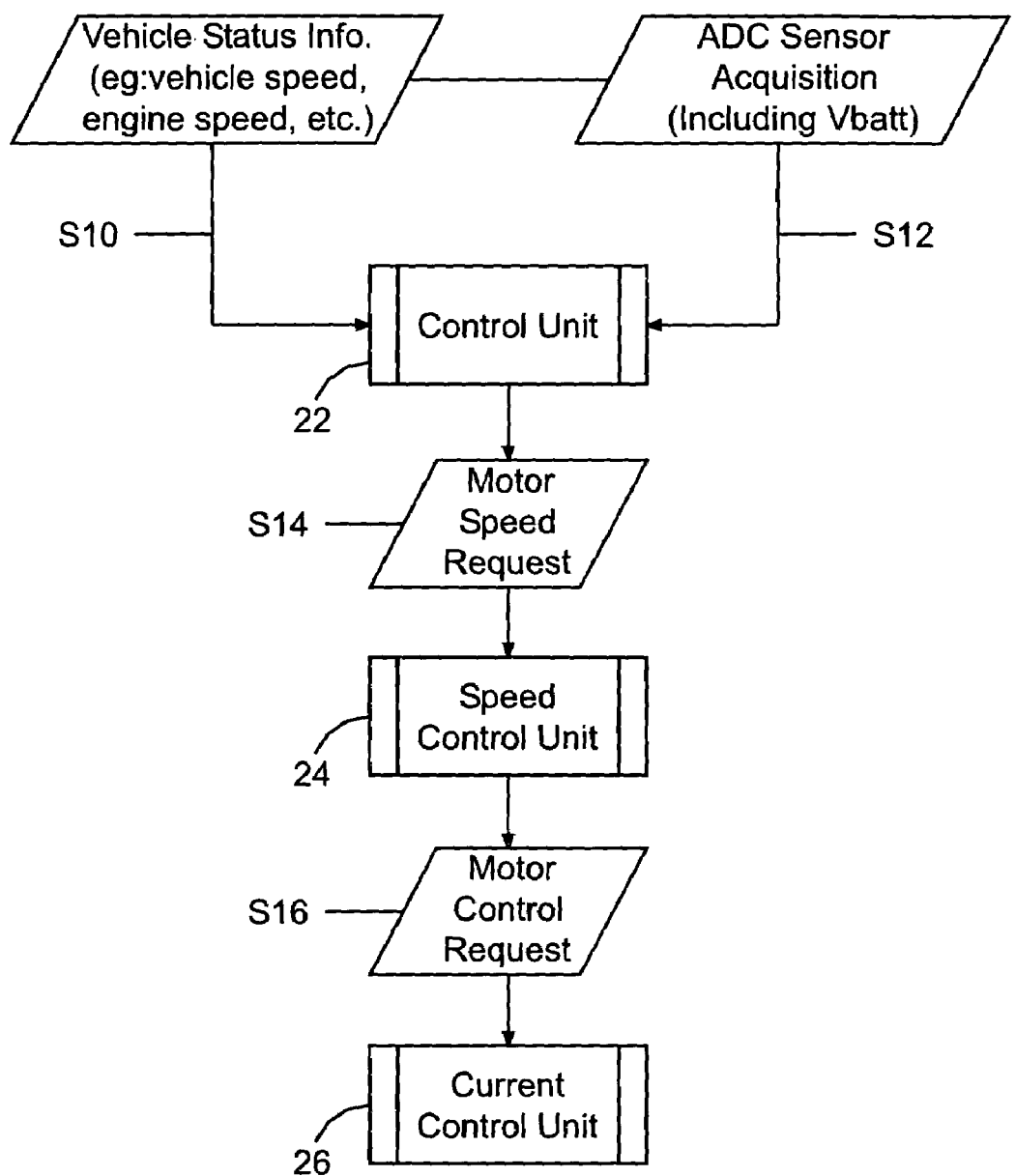
FIG. 4 shows a conventional motor control algorithm executed by a microcontroller in an automotive application.

To implement a method for controlling the operation of motors in modern automotive applications, micro-controllers are used to execute control algorithms. FIG. 4 shows an example of a conventional control algorithm for controlling the speed of a motor in an automotive application. As shown in FIG. 4, vehicle status information such as vehicle speed, engine speed etc. which are collected by sensors external to the micro-controller, and data collected by analog to digital (ADC) sensors such as the voltage of the battery which may be collected by the micro-controller's internal sensors are sent to control unit 22 of the micro-controller as illustrated by steps S10 and S12, respectively. Control unit 22 then determines whether the speed of a given motor (for example, a motor in a power steering system) should be increased. If so, control unit 22 makes a request for increasing the speed of the motor S14. The request to increase the speed of the motor is then passed to a speed control unit 24 which in turn requests an increase in the current that is to be delivered to the motor as shown by step S16. The request to increase the current is then passed to current control unit 26 which then supplies enough current to meet the requested increase in the speed.

According to the present invention, the algorithm executed by a micro-controller, such as the algorithm shown by FIG. 4, is modified to cause the consumption of the excess transient energy during a load dump event thereby preventing damage that may be caused by the load dump transient voltage.

Figure 5A:
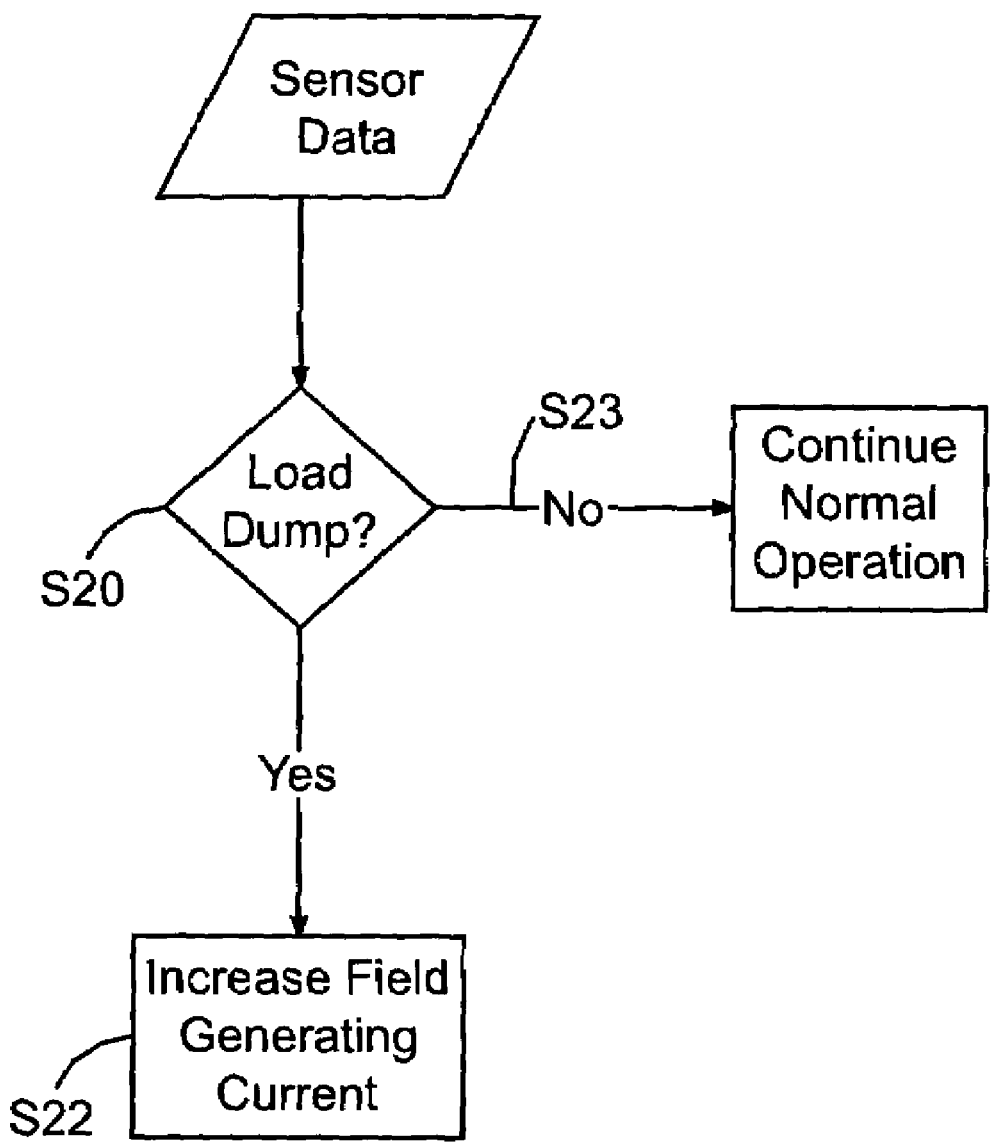
FIG. 5A shows an algorithm for prevention of damage due to load dump according to the first embodiment of the present invention.

According to the first embodiment of the present invention, when a load dump condition is detected, the controller, for example, controller 16 in FIG. 3, increases the field generating current in order to force the motor, for example, motor 20, to enter its saturation zone. When motor 20 enters saturation its iron losses are greatly increased. Specifically, as the field increases the iron losses increase in a non-linear manner thus the current consumed by motor 20 is increased in a non-linear manner. As a result, the transient voltage caused by the load dump is lowered and damage is averted. In other words, according to the first embodiment of the present invention, motor 20 is caused to operate inefficiently intentionally in order to consume the excess energy that is received due to the load dump event. These steps are illustrated by FIG. 5A which shows that upon detection of a load dump event S20 based on data received from the sensors, the field generating current is increased S22 in order to cause the motor to enter its saturation zone. If load dump is not detected S23, normal operation is continued.

It should be noted that to ensure the increase in the field generating current does not interfere with the normal operation of motor 20, as the field generating current is increased, the torque generating current must be decreased so that the torque remains constant.

To implement the method according to the first embodiment of the present invention the control algorithm must request a sufficient field generating current to limit the voltage on the electronic circuit. The value can be calculated in a closed loop system, which requires a high-bandwidth controller, or through testing and used in an open-loop (feed-forward) control scheme, which requires a very limited bandwidth controller. Also, to ensure the protection against the transient voltage over the operative range of the motor, it must be verified that when the motor speed is increased close to the base speed, the current absorbed by the system is enough to limit the voltage to a safe value because above the base speed the bus voltage may not be enough to allow the motor to enter the saturation zone.

A method according to the first embodiment of the present invention is advantageous in that it allows the torque generation to remain active and maintain the torque output throughout the load dump event. The torque output, however, may be affected because during saturation the torque constant changes non-linearly. In order to improve the torque control during a load dump condition, the saturation zone can be identified in advance and used to correct the current request during the load dump event. Thus, the method according to the first embodiment of the present invention can be used in applications that require torque control at all times for safety or other reasons. Using the method of the first embodiment of the present invention, the amount of torque ripple can be effectively reduced to levels comparable to those obtained when a Zener diode is used for over-voltage protection.

Figure 5B:
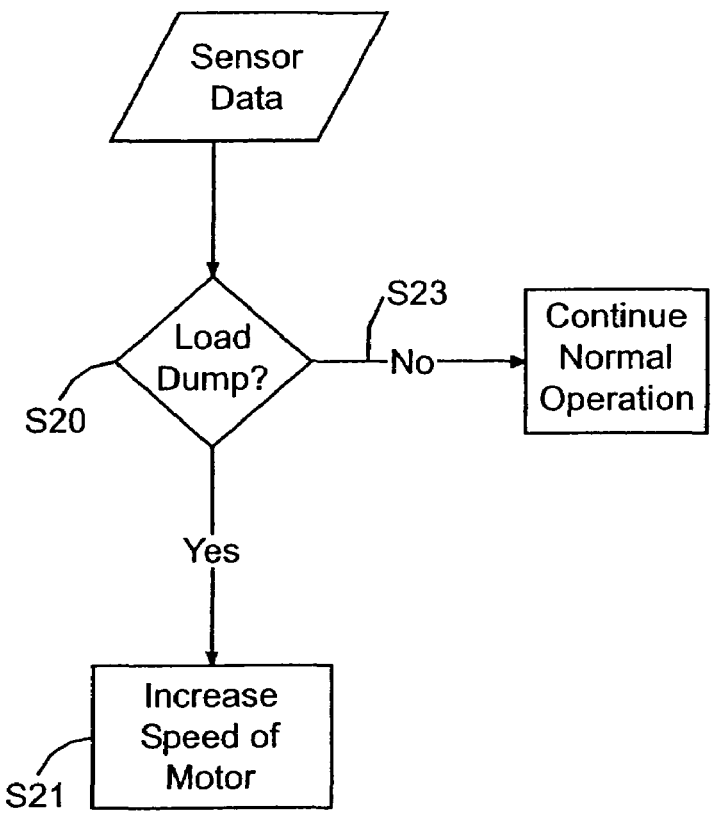
FIG. 5B shows an algorithm for prevention of damage due to load dump according to the second embodiment of the present invention.

Some motor drives do not distinguish between the field-producing current and the torque-producing current. According to the second embodiment of the present invention, in order to consume the transient energy during a load dump event when the motor drive does not distinguish between the field-producing current and the torque-producing current, the transient energy may be directed to and consumed by any mechanical load suitable for such consumption, such as a motor. For example, in a conventional motor control arrangement which includes an inverter circuit for driving a motor, and a speed control circuit for limiting the speed of the motor, when a load dump event is detected the speed control circuit may be temporarily disabled. The command to the inverter is then calculated to increase the current that is delivered to the motor. FIG. 5B schematically illustrates the second embodiment of the present invention, which in contrast with the first embodiment as illustrated by FIG. 5A, includes a step for increasing the speed of the motor instead of driving the motor into saturation. The amount of the required increase in the current that is delivered to the motor may be determined either in a closed-loop way to maintain the voltage at the desired level which requires a high-bandwidth controller, or through testing and used in an open-loop (feed-forward) control scheme which requires a very limited bandwidth controller. In both cases, the controlling parameter which can be used to increase the current delivered to the motor can be either the current reference for a current circuit or the duty-cycle. As was the case with the first embodiment, it must be verified that at maximum speed the minimum load draws sufficient current to limit the voltage to an acceptable level in order to avert damage that may be caused by the excess transient energy due to the load dump event.

In a system devised according to the second embodiment of the present invention the increased torque output, which normally results in increased speed, must be tolerated by the specific application. Therefore, a trade-off between the voltage reduction and the speed increase may be necessary.

As is clear from the above, to implement a method according to the present invention, a load dump event must be first detected. The input voltage in a conventional system is monitored to enable the unit to shutdown in either over-voltage or under-voltage conditions. The load dump detection algorithm must be able to distinguish between normal over-voltage and a load dump event. According to one aspect of the present invention, to distinguish between normal over-voltage events and a load dump event the voltage of the battery is monitored over time. If the increment between two consecutive voltage samples is greater than 0.5V the micro-controller enters a load dump mode, in which it remains until the voltage reaches a value under the maximum allowed value (e.g. 16.5V). Also, if the voltage is above 21V, regardless of the slope, the micro-controller enters a load dump mode.

Figure 6:
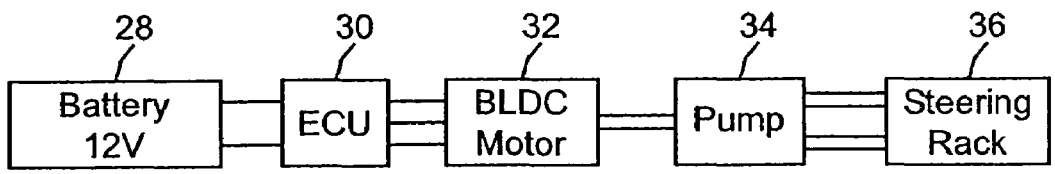
FIG. 6 shows a functional block diagram for a conventional electronic hydraulic power system.

A method according to the second embodiment of the present invention has been successfully applied to an Electric Hydraulic Power System (EHPS). FIG. 6 shows a functional block diagram for a conventional EHPS. Referring to FIG. 6, a conventional EHPS includes a power source, such as 12V battery 28, ECU 30 which is operatively connected to and controls brushless DC (BLDC) motor 32. BLDC motor 32 in turn operates pump 34 which is connected in a well known manner to steering rack 36. To apply the second embodiment of the present invention to an EHPS such as the one shown by FIG. 6, the control of the speed of BLDC motor 32 was only used to limit power dissipation in the hydraulic bypass valve, so a momentary increase in the speed would not have any detectable effects on the steering system thereby allowing the implementation of the second embodiment.

A conventional EHPS uses a Zener diode in parallel with its ECU to obtain over-voltage protection. The Zener diode in a conventional EHPS was eliminated by modifying the motor control algorithm in a manner to cause the consumption of the transient energy received by the ECU during a load dump event.

Figure 7:
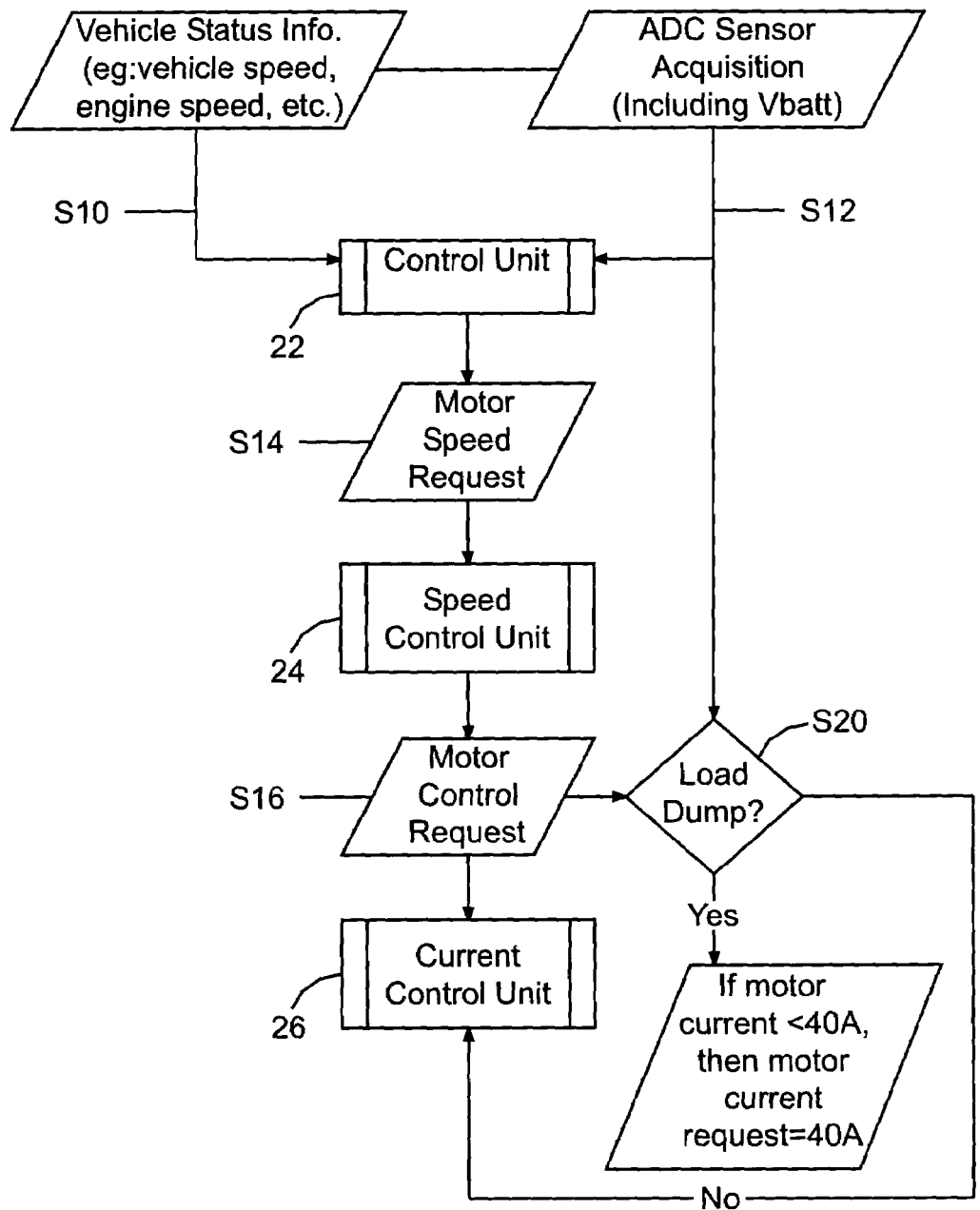
FIG. 7 shows a motor control algorithm executed by a microcontroller for an automotive application according to the present invention.

Specifically, the motor control algorithm was modified to allow BLDC motor 32 to consume more current. FIG. 7 shows the algorithm which may be performed by an ECU of an EHPS modified according to the present invention. It should be noted that FIG. 4 shows a conventional algorithm for controlling the speed of a motor, such as, BLDC motor 32, in a conventional EHPS. FIG. 7 shows the algorithm performed in an EHPS as modified according to the second embodiment of the present invention.

According to FIG. 7, when a load dump event is detected S20 the micro-controller enters a load dump mode. When the micro-controller enters the load dump mode, the current request from the speed loop is limited to a minimum value which is determined experimentally (e.g. 40A). The minimum value is obtained to ensure that sufficient current is drawn by BLDC motor 32 to consume the transient excess energy during the load dump. Therefore, because before the load dump event the motor speed and the load required a current below the minimum value (e.g. 40A) the motor will accelerate upon receiving the higher current value (e.g. 40A), but as described earlier this should have no effect on the steering assist function. It should also be noted that during the sudden voltage increase, the current also increases suddenly because the current control unit 26 doesn't have sufficient bandwidth to decrease the duty-cycle. Therefore, the step response of the current control unit 26 is not required to be extremely fast. In fact, the current reference is never reached during the load dump transient. As shown in FIG. 7, when the load dump event is no longer detected, the load dump mode is exited, and the micro-controller uses the current reference of the speed loop directly.

Figure 8:
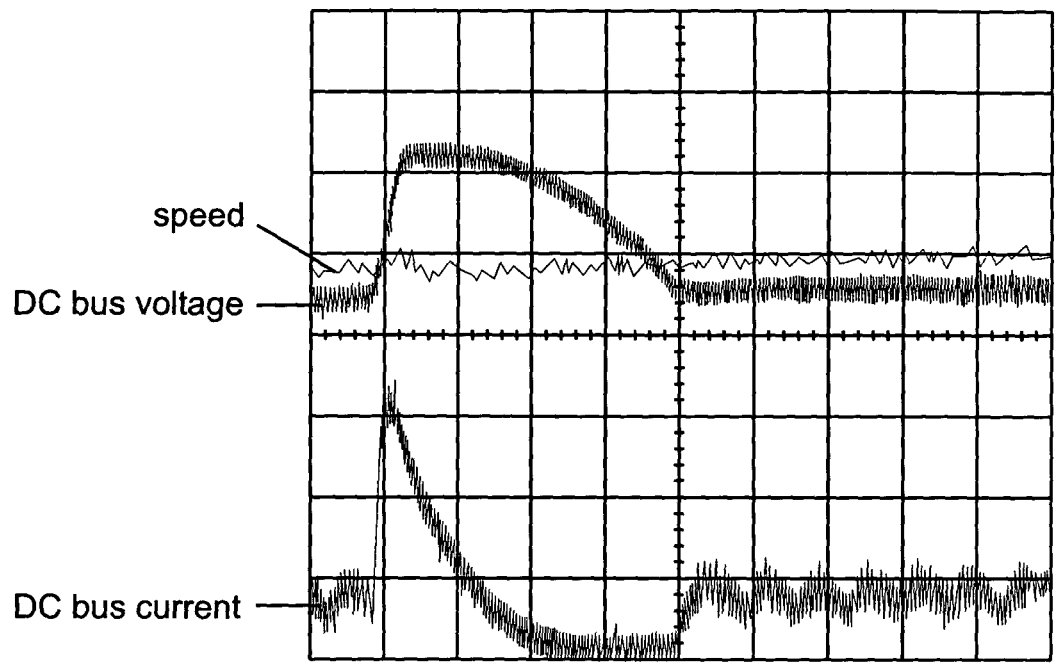
FIG. 8 shows a graphical representation of over-voltage suppression in response to a load dump event when a 27V Zener diode is used in parallel with the protected circuitry according to the prior art.
Figure 9:
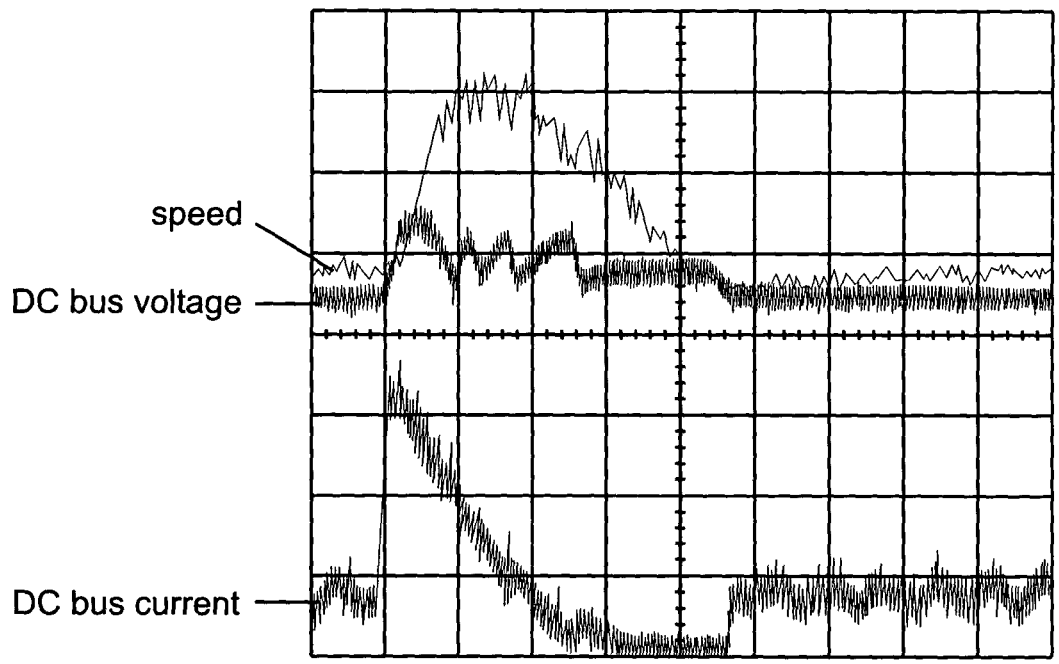
FIG. 9 shows a graphical representation of over-voltage supression in response to a load dump event when a method according to the present invention is employed.

FIG. 8 graphically shows the results of transient suppression using a 27V Zener diode during a load dump event, while FIG. 9 graphically shows the results of transient management according to the second embodiment of the present invention. Specifically, FIG. 8 shows the speed, the DC bus voltage, and the DC bus current over time (abscissa) when a Zener diode is used, while FIG. 9 shows the speed, the DC bus voltage, and the DC bus current over time (abscissa) when a method according to the present invention is used. When the results shown by FIG. 8 are compared to those shown by FIG. 9 it can be seen that the voltage can be reduced below what is currently achievable with the Zener diode.

The method of the present invention allows the elimination of the expensive and large Zener diode and does not require additional hardware; only components already normally present in the system are used. Also, when a method according to the present invention is employed, the voltage is actively controlled to a value that can be chosen by software which requires only minor changes in the motor control software.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method for protecting an electronic circuit in an automobile comprising:
   detecting a load dump event based on at least one value of voltage; and
   increasing the current drawn by said electronic circuit in response to said at least one value of voltage; wherein said electronic circuit is connected to a voltage source and a voltage detector that samples the voltage output from said voltage source, and wherein said load dump event is detected when two consecutive voltage samples from said voltage source are different from one another by a predetermined value.

2. The method of claim 1, wherein said predetermined amount is 0.5 Volts.

3. The method of claim 1, wherein said electronic circuit is connected to a voltage source and a voltage detector that measured the voltage output from said voltage source, and wherein said load dump event is detected when voltage output from said voltage source is measured by said voltage detector to have reached a predetermined maximum value.

4. The method of claim 3, wherein said predetermined maximum value is 21 Volts.

5. The method of claim 1, wherein said electronic circuit includes a motor and said drawn current in increased by driving said motor into saturation.

6. The method of claim 1, wherein said electronic circuit includes a motor and a motor controller which controls a current for generating a magnetic field and a current for generating torque, and wherein said current for generating a magnetic field is increased by said motor controller in response to said load dump event to drive said motor into saturation to increase the current drawn.

7. The method of claim 6, wherein said current for generating a magnetic field is provided based on a reference current for generating a magnetic field and wherein said reference current for generating a magnetic field is increased by increasing said reference current for generating a magnetic field.

8. The method of claim 6, wherein said current for generating torque is decreased to maintain the torque.

9. The method of claim 1, wherein said electronic circuit includes a current loop which provides current to a motor based on a current reference, and further comprising increasing said current reference to increase the current drawn.

10. The method of claim 1, wherein said electronic circuit draws current of a predetermined duty cycle, and further comprising modifying said duty cycle to increased the current drawn.

11. The method of claim 10, wherein said electronic circuit comprises an Electric Hydraulic Power System.

12. The method of claim 1, wherein said electronic circuit includes a motor and wherein the speed of said motor is increased to increase the current drawn.

13. The method of claim 12, wherein said electronic circuit includes a speed control loop, and wherein said speed control loop is disabled to increase the speed of said motor.

14. A method for preventing damage to an electronic circuit due to an excess transient energy during an over-voltage event, comprising:
   detecting said over-voltage event based on at least one value of voltage; and
   causing the consumption of said excess transient energy in response to said at least one value of voltage; wherein said electronic circuit is connected to a voltage source and a voltage detector that samples the voltage output from said voltage source, and wherein said over-voltage event is detected when two consecutive voltage samples from said voltage source are different from one another by a predetermined value.

15. The method of claim 14, wherein said excess transient energy is consumed by a motor.

16. The method of claim 15, wherein said motor is driven into saturation.

17. The method of claim 15, wherein the speed of said motor is allowed to increase to consume the excess transient energy.

18. The method of claim 14, wherein an electronic device is intentionally operated inefficiently in order to consume the excess transient energy.

19. The method of claim 14, wherein a load dump event causes said excess transient energy.

* * * * *

UNITED STATES PATENT AND TRADEMARK OFFICE
CERTIFICATE OF CORRECTION

PATENT NO. : 7,061,736 B2
APPLICATION NO. : 10/403246
DATED : June 13, 2006
INVENTOR(S) : Andrea Gorgerino and Klaus S. Jensen It is certified that error appears in the above-identified patent and that said Letters Patent is hereby corrected as shown below:

Please correct the title on the invention as follows:

On the title page item (54) and Col. 1, line 1,
--METHOD TO PROTECT ELECTRONICS FROM LOAD DUMP--.

Signed and Sealed this

Twelfth Day of September, 2006

JON W. DUDAS
*Director of the United States Patent and Trademark Office*